(12) United States Patent
Simpson et al.

(10) Patent No.: US 7,349,543 B2
(45) Date of Patent: Mar. 25, 2008

(54) SECURE FOREIGN ENTERPRISE PRINTING

(75) Inventors: Shell S. Simpson, Boise, ID (US);
Daniel Revel, Portland, OR (US); Alan C. Berkema, Granite Bay, CA (US);
David M. Hall, Camas, WA (US);
Patrick O. Sandfort, Tucson, AZ (US);
Darrel D. Cherry, Boise, ID (US);
Jeremy Bunn, Kelso, WA (US);
Kenneth L. Oakeson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 10/686,979

(22) Filed: Oct. 16, 2003

(65) Prior Publication Data

US 2005/0084113 A1 Apr. 21, 2005

(51) Int. Cl.
*H04K 1/00* (2006.01)
(52) U.S. Cl. .................. 380/270; 713/155; 713/165; 713/176; 380/255; 380/282; 455/41.1; 455/41.2; 455/41.3; 455/557; 358/1.14; 358/1.15
(58) Field of Classification Search ............ 713/155, 713/165, 176; 380/255, 270, 282; 455/41.1, 455/41.2, 41.3, 557; 358/1.14, 1.15
See application file for complete search history.

(56) References Cited

U.S. PATENT DOCUMENTS

| | | | | |
|---|---|---|---|---|
| 5,768,373 A * | 6/1998 | Lohstroh et al. | ............ | 380/286 |
| 6,378,070 B1 * | 4/2002 | Chan et al. | ................. | 713/155 |
| 6,711,677 B1 * | 3/2004 | Wiegley | ..................... | 713/151 |
| 6,751,732 B2 * | 6/2004 | Strobel et al. | .............. | 713/176 |
| 6,912,374 B2 * | 6/2005 | Clough et al. | ............. | 455/41.2 |
| 6,922,725 B2 * | 7/2005 | Lamming et al. | ........... | 709/227 |
| 6,978,299 B1 * | 12/2005 | Lodwick | ..................... | 709/223 |
| 7,003,667 B1 * | 2/2006 | Slick et al. | ................ | 713/182 |

* cited by examiner

*Primary Examiner*—Kim Vu
*Assistant Examiner*—April Y. Shan

(57) ABSTRACT

Example systems, methods, computer-readable mediums, and other forms of a secure foreign enterprise printing system are provided. An example system may include a wireless telephonic logic for communicating with a wireless network web services provider and a wireless network communication logic configured to communicate a print request to the wireless network web services provider using the wireless telephonic logic. The print item may be stored in a first enterprise and may be printed on an image forming device that is located in a second enterprise. The example system may also include an encryption logic configured to facilitate providing security for the print item as it travels from the first enterprise to the image forming device.

31 Claims, 12 Drawing Sheets

US 7,349,543 B2

SECURE FOREIGN ENTERPRISE PRINTING

TECHNICAL FIELD

The systems, methods, storage media, and so on described herein relate generally to computer based printing and more particularly to securely printing data, where a mobile communication device (e.g., cellular telephone) with access to data on a home enterprise interacts with a foreign enterprise.

BACKGROUND

Cellular telephone printing services have conventionally been limited by resource constraints like memory size, processor power, and the like. Thus, print related activities like rendering, queuing, and compressing data may have been performed remotely (e.g., not on the cellular telephone). This remote print processing may have exposed print data in an insecure format (e.g., not encrypted) to parties or entities other than the owner or intended viewers. Furthermore, cellular telephone printing services have conventionally been limited by the presence of firewalls that may block inter-enterprise communications.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
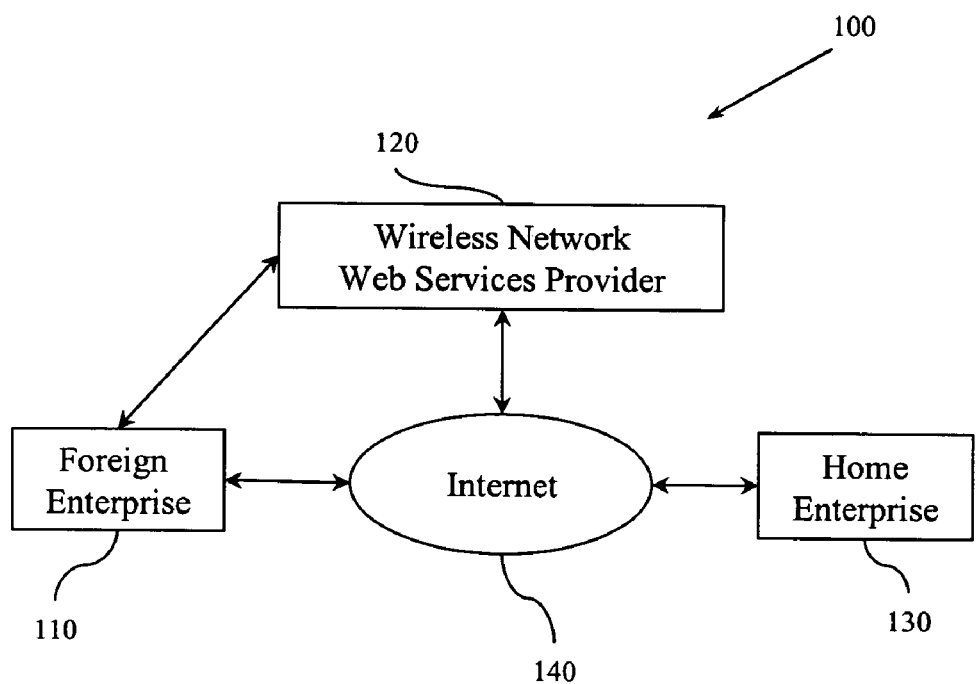
FIG. 1 illustrates an example system in which secure foreign enterprise printing may be desired.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Address", as used herein, includes but is not limited to one or more communication network accessible addresses, device identifiers, IP (Internet Protocol) addresses, e-mail addresses, a distribution list including one or more e-mail addresses, URL (Uniform Resource Locator) and FTP (File Transfer Protocol) locations or the like, network drive locations, a globally unique identifier (GUID), a postal address, or other types of addresses that can identify a desired destination or device.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like those generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic like an application specific integrated circuit (ASIC), a programmed logic device, a memory device containing instructions, or the like. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to one or more electrical or optical signals, analog or digital, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained as part of a computer-readable medium as defined previously. Another form of the software may include signals that transmit program code of the software to a recipient over a network or other communication medium.

"User", as used herein, includes but is not limited to one or more persons, software, computers, logics, other devices, or combinations of these.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

An "operable connection", or a connection by which entities are "operably connected", is one in which signals, physical communication flow, and/or logical communication flow may be sent and/or received. Typically, an operable connection includes a physical interface, an electrical interface, and/or a data interface, but it is to be noted that an operable connection may include differing combinations of these or other types of connections sufficient to allow operable control.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example system 100 in which secure foreign enterprise printing may be desired. Secure foreign enterprise printing may be desired when, for example, a user wants to print, on a printer that is located in a foreign enterprise, an item that is stored on their home enterprise. By way of illustration, a first attorney from a first law firm may be meeting with a second attorney at a second law firm to negotiate the details of a contract. The first attorney may have an assistant preparing revisions to the contract. When the assistant completes the revisions, the assistant may, for example, send an email to the first attorney indicating that the revisions are complete. The first attorney may want to receive a printout of the revised contract. But the first attorney is now in a foreign enterprise, the computer enterprise of the second attorney. Furthermore, the revised contract may have to transit the public Internet to be transmitted from the home enterprise of the first attorney to the foreign enterprise of the second attorney. Thus, the first attorney would prefer that the revised contract be transmitted to a specific printer on the foreign enterprise, and the revised contract not be exposed to unintended viewers.

The first attorney may receive, on a cellular telephone, for example, a message like a multimedia message service (MMS) message, a short message service (SMS) message, an email, and the like. MMS concerns a store and forward method for transmitting related items like graphics, video clips, sound files, short text messages and the like via wireless networks. MMS may be implemented over a wireless application protocol (WAP). WAP defines a secure specification that facilitates users accessing MMS messages, substantially instantaneously, via their cellular telephones. The cellular telephones can include, but are not limited to, mobile phones, pagers, two way radios, smart phones, connected email device (e.g., Blackberry) communication systems, and the like. WAP implementations can support wireless network technologies like cellular digital packet data (CDPD) networking, code division multiple access (CDMA) processing, global system for mobile communication (GSM) networking, time division multiple access (TDMA), and so on. WAP may be supported by operating systems including those engineered for handheld devices. Thus, the first attorney may receive an email notification via a cellular telephone call that the revisions are complete and ready for printing.

Therefore, in FIG. 1, a user (e.g., first attorney) interacting with a foreign enterprise 110 may want to employ print services provided by a wireless network web services provider 120 to access a print item (e.g., revised contract) in a home enterprise 130. The wireless network web services provider 120 may be, for example, a telephone company or other entity that provides web services on the public Internet and who has a wireless communication network like a cellular telephone network. The user may employ a wireless communication (e.g., cellular telephone call) to send a print request to the wireless network web services provider 120. The wireless network web services provider 120 may authenticate the user through conventional wireless communication techniques and identify a gateway to the home enterprise 130 where the print item resides. The wireless network web services provider 120 may then employ the public Internet 140 (or other network) to request the print item from the home enterprise 130.

Recall that the user desires end to end security for the print item, which means that the print item should not be seen in an insecure format by any unintended viewers either human, electronic, or computer-based. Conventionally, print solutions for foreign enterprise printing have not provided end to end security. By way of illustration, a telephone company providing wireless network web services may have seen the plain text (e.g., unencrypted) print data. Or, if print data rendering was performed by a logic outside the phone or printer, the rendering logic and/or network communication components may have seen the plain text print data.

Figure 2:
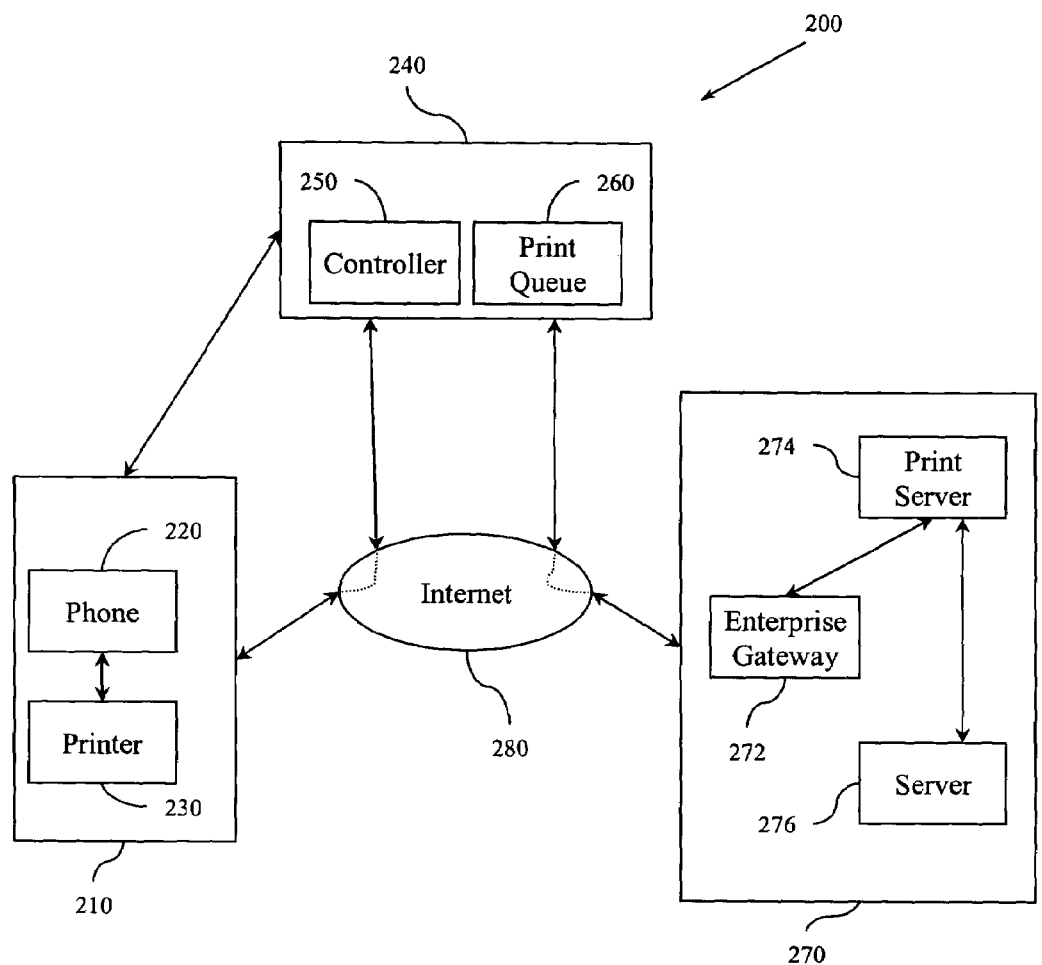
FIG. 2 illustrates an example system for secure foreign enterprise printing.

Thus, FIG. 2 illustrates an example system 200 for secure foreign enterprise printing. A user may be interacting with a foreign enterprise 210 when the user determines to print a print item. The user may have a wireless mobile communication device like a cellular telephone 220. The cellular telephone 220 may have, for example, a browser or file selection application that facilitates identifying a print item to print. The phone 220 may discover a printer 230 that is capable of printing a document for the user. For example, IEEE (Institute of Electrical and Electronics Engineers) 802.11, Bluetooth, and/or other discovery mechanisms may be employed to discover the printer 230. The phone 220 may be aware of a wireless network services provider 240 that has a controller 250 to which the phone 220 can send the print request. Since the user desires end to end security, the user may transmit, in addition to an identifier that identifies the print item to print, an encryption data that can be employed to encrypt the print item. The encryption data may be, for example, a public key component of a public/private key pair that has a public key component and a private key component. The wireless network services provider 240 may also include a print queue 260 into which the encrypted print item can be placed while being transferred from a foreign enterprise 270 to the printer 230.

The controller 250 may determine that a particular enterprise gateway 272 is suitable for accessing the foreign network 270. Therefore, the controller 250 may send a request to the enterprise gateway 272 for the print item. The request may include both the print item identifier and the encryption data. The enterprise gateway 272 may then request the print item from a print server 274 that in turn may request the data from a server 276. In one example, the print server 274 may be a mobile enterprise printing (MEP) print server that employs a print service interface (PSI) protocol to interface with the server 276. MEP is a print server that can perform actions like receiving a print request, fetching content, converting it to a printer-ready format and transmitting it to a print requester and/or identified destination. PSI is a print service interface that can interact with MEP to support printing, print discovery services, printing requests, and the like. The server 276 may be, for example, an email server, an image server, a message server, a file server, and the like. The print server 274 and/or some other component(s) (not illustrated) in the home enterprise may then process the print item before sending it to the print queue 260 via the public Internet 280 or some other network. Processing the print item may include, for example, encrypting the print item using the encryption data provided in the print request. In one example, the print item is encrypted using the public key provided in the print request. In another example, the public key is employed to generate a session key. The session key can then be employed to encrypt the print item. Thus, the print item sent to the print queue 260 may include an encrypted print item, an encrypted session key, and so on. Processing the print item may also include, for example, rendering the print item into a printer specific format, content transforming the print item into a printer independent format, compressing the print item, and so on.

Once the print item is stored in the print queue 260, it is available for printing by the printer 230. Thus, the printer 230 may request (e.g., pull) the print item from the print queue 260, and/or the print queue 260 may send (e.g., push) the print item to the printer 230. When the print item arrives at the printer 230 it may still be encrypted. The print item has not yet been exposed in an insecure format outside the home enterprise 270. So now the printer 230 may be tasked with decrypting the print item. The printer 230 may, in one example, parse the encrypted session key out of the print item and send the encrypted session key to the phone 220. The phone 220 and the printer 230 may communicate using, for example, IEEE 802.11, IEEE 802.15, infrared, Bluetooth, and other methods. The phone 220 may then employ the private key component of the public/private key pair to decrypt the session key and provide it back to the printer 230, which can then employ the decrypted session key to decrypt the encrypted print item. In another example, the phone 220 may provide the private key to the printer 230. In this example, the public/private key pair may have been a one time public/private key pair generated for processing this print item. In another example, the printer 230 may have generated the one time public/private key pair and may have provided the public key to the phone 220 which then provided it to the home enterprise 270 via the wireless network web services provider 240. Thus, the printer 230 would already have the private key for decrypting the encrypted print item. Those skilled in the art will appreciate that there are other methods (e.g., accessing a public/private key server) for providing an encryption data to the home enterprise 270 that facilitates providing end to end security for the print item.

FIG. 2 illustrates a user employing two paths to facilitate having end to end security for the print item. The first path includes a wireless communication between a wireless device like the cellular telephone 220 and the wireless network web services provider 240. The second path includes a wired and/or wireless path across the Internet 280 (or other network). The wireless communication from the cellular telephone 220 facilitates the wireless network web services provider 240 using cellular telephone user authentication techniques, which may facilitate access to the enterprise gateway 272.

Figure 3:
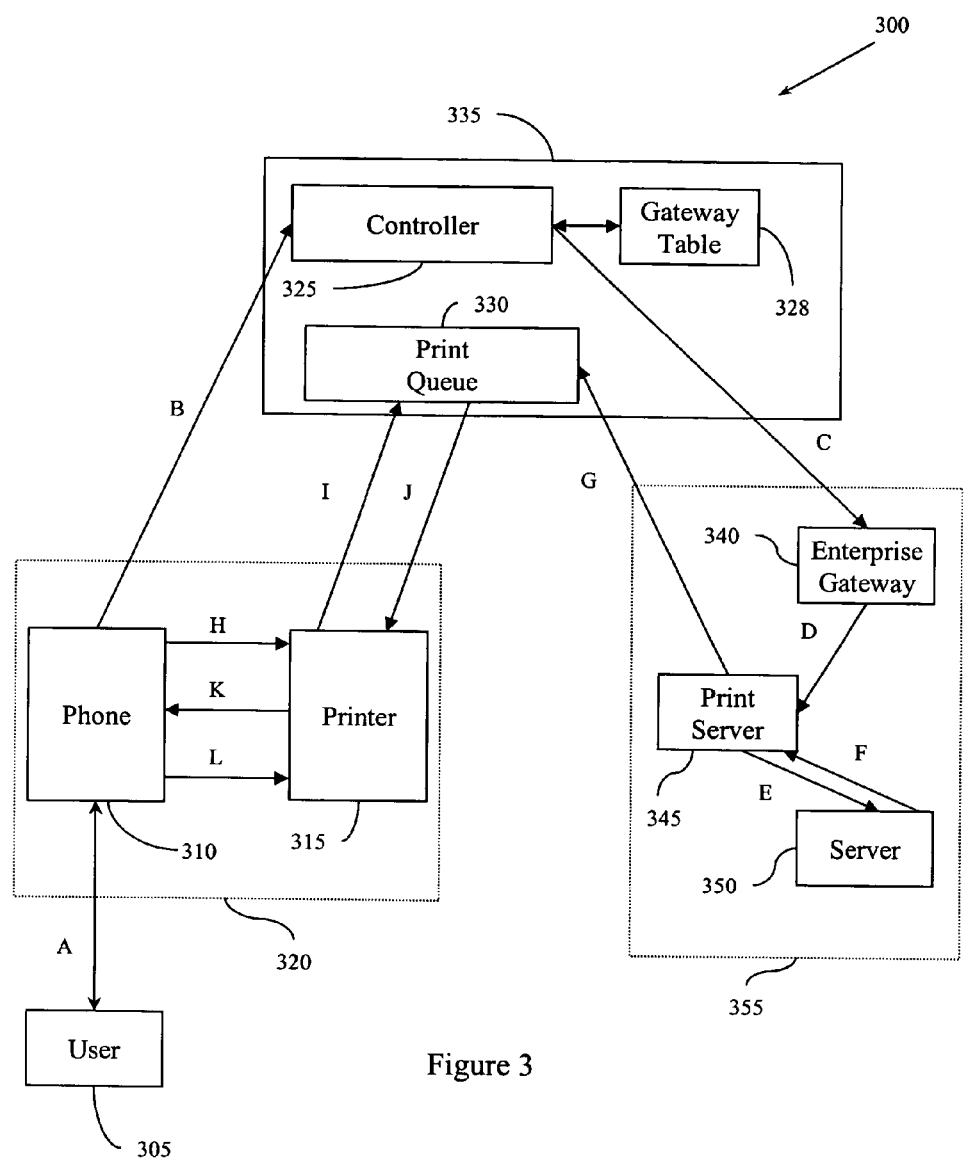
FIG. 3 illustrates an example system and data flow associated with secure foreign enterprise printing.

FIG. 3 illustrates an example system 300 and data flow associated with secure foreign enterprise printing. A user 305 accesses, via communication A, a phone 310 and selects a print application. The phone 310, which has discovered a printer 315 in a foreign enterprise 320, sends, via communication B, a message (e.g., print request) to a controller 325. The print request may include, for example, a print item identifier, a user identifier, an encryption key, an image forming device address, an image forming device model data, an image forming device capability data, and a printer data. The controller 325 may then access a gateway table 328 to determine a gateway to which the print request can be sent. A print queue 330 may also be part of a wireless network web services provider 335 in which the controller 325 and the gateway table 328 reside. In communication C, the controller 325 transmits the print request to a home enterprise 335 via an enterprise gateway 340. In one example, the communication C may be initiated by controller 325 if, for example, the enterprise gateway 340 has been configured to receive that type of request. In another example, the gateway 340 may query (e.g., periodically poll) the controller 325 for requests. In another example, the gateway 340 may poll the controller 325 after the gateway 340 rejects a request from the controller 325.

In communication D, the gateway 340 employs a print server interface (e.g., PSI) to access a print server 345. The print server 345 then communicates, at E, with a server 350 (e.g., mail server, image server, message server, file server) which provides, at F, the print item to the print server 345. The print server 345 then processes the print item (e.g., encrypts, renders, content transforms, compresses) the print item and, via communication G, which may traverse the Internet, provides the print item to the print queue 330. The communication G may be, for example, a hypertext transfer protocol (HTTP) post message.

In communication H, the phone 310 asks the printer 315 to fetch and print the print item in the print queue 330. Those skilled in the art will appreciate that there are various methods for handling the synchronization issues associated with initiating a first print request via communication B and initiating a second, related print request via communication H. Communications I and J transmit the print request and the print item from the print queue 330 to the printer 315. In one example, the print queue 330 pushes the print item to the printer 315 via communication J and printer 315 acknowledges the receipt via communication I. In another example, the printer 315 requests the print item via communication I (e.g., HTTP get) and the print queue provides the data via communication J (e.g., HTTP send).

The printer 315 may thus have an encrypted print item. Therefore, via communication K, the printer 315 may request encryption services from the phone 310. For example, the phone 310 may receive an encrypted session key via the communication K and return an unencrypted session key via communication L. In one example, if the printer 315 was employing its own public/private key pair, then the printer 315 would not ask the phone 310 for encryption services and thus communications K and L would be unlikely to occur.

It is to be appreciated that the data flows illustrated in communications A through L are but one possible data flow and that other communications transmitting other information in other orders can be employed with the example systems and methods described herein.

Figure 4:
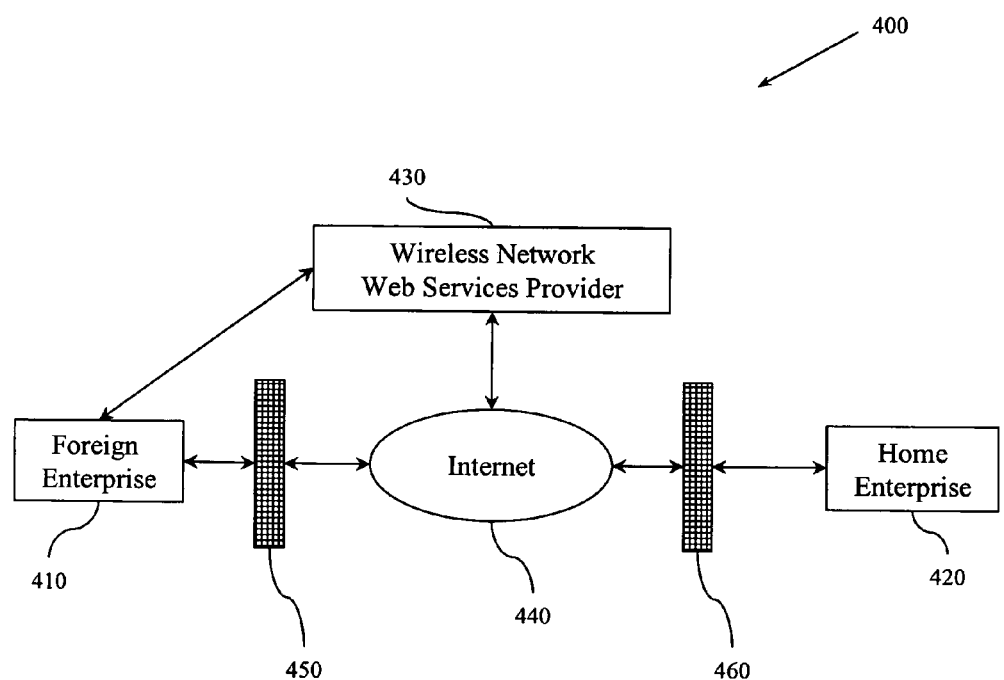
FIG. 4 illustrates an example system in which secure foreign enterprise printing may be desired.

FIG. 4 illustrates an example system 400 in which secure foreign enterprise printing may be desired. A user interacting with a foreign enterprise 410 may desire end to end security for a print item from a home enterprise 420. The user may have access to a wireless network web services provider 430 via, for example, a cellular telephone. The foreign enterprise 410 and the home enterprise 420 may be connectable by the Internet 440. However, traffic into and/or out of an enterprise may be impacted by the presence of a firewall. For example, traffic into the foreign enterprise 410 may be limited by a firewall 450. Similarly, traffic into the home enterprise 420 may be limited by a firewall 460. In general, a firewall can be configured to allow certain traffic to enter and/or leave a network. Thus, in one example, an enterprise can be considered to be a network located behind a firewall. A firewall may, for example, block requests for services from entering a network protected by the firewall. Thus, generally, entities outside a firewall cannot initiate contact with entities protected by the firewall without the firewall being specially configured to allow such contact. Some firewalls are configured to allow, for example, HTTP post and get messages.

So the presence of a firewall can impact the ability of a print request that originates in the foreign enterprise 410 from acquiring a print item located in the home enterprise 420 since the print request may be blocked by firewall 460. Thus, in one example secure foreign enterprise printing system the firewall 460 may be configured to accept certain requests (e.g., print request in an HTTP get message). In another example, an entity in the home enterprise 420 may be configured to periodically poll the wireless network web services provider 430 to determine whether any print requests for print items in the home enterprise 420 are awaiting delivery. In another example, the firewall 460 may receive and reject a request from the wireless network web services provider 430. When the firewall 460 rejects certain types of requests an entity in the home enterprise 420 may be signaled (e.g., interrupted, messaged) and this may cause the home enterprise 420 to query the wireless network web services provider 430 for a print request.

Figure 5:
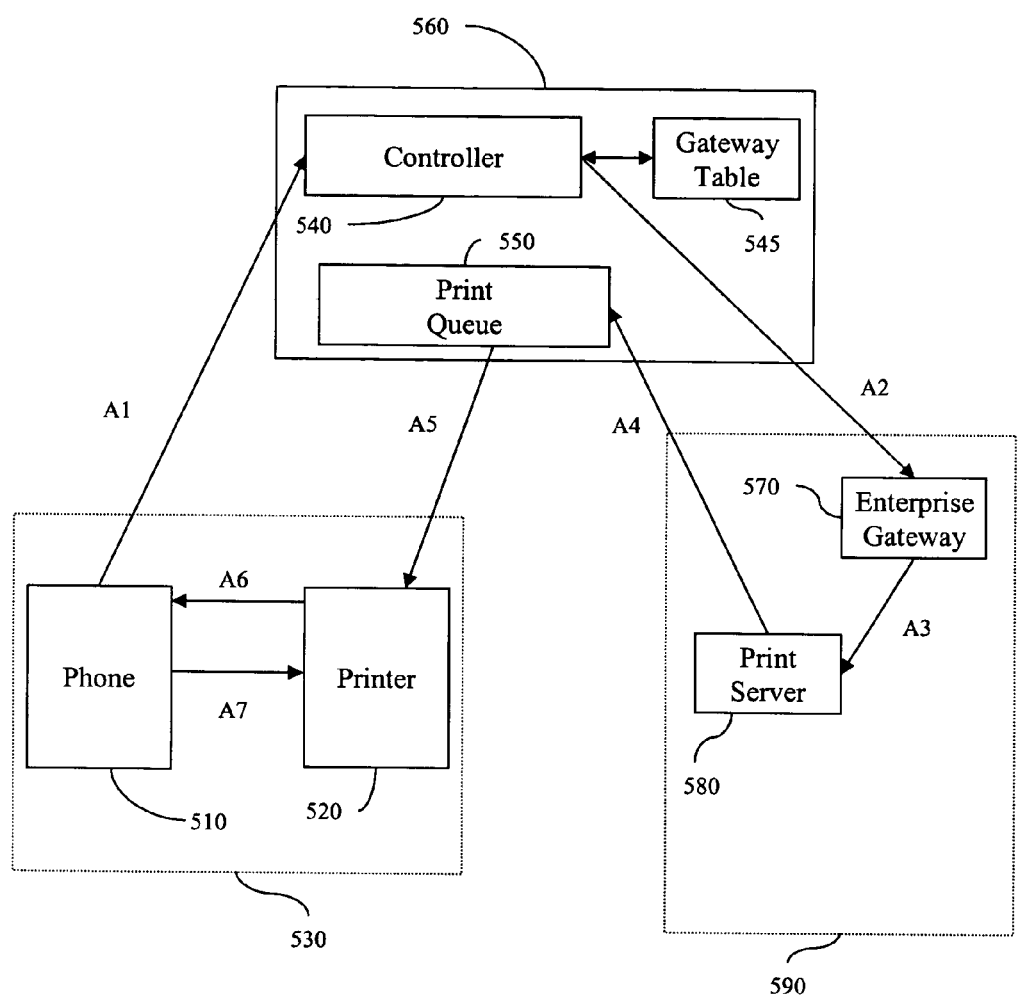
FIG. 5 illustrates an example encryption key data flow associated with secure foreign enterprise printing.

FIG. 5 illustrates an example encryption key data flow associated with secure foreign enterprise printing. In the example, a phone 510 may interact with a printer 520 located in a foreign enterprise 530. For example, the phone 510 may discover the printer 520 and then determine to print a print item on the printer 520. Thus, using communication A1, the phone 510 may send a public key to a controller 540 that will initiate having the desired print item deposited in a print queue 550. The controller 540, which may be provided by a wireless network web services provider 560 can then forward the public key via communication A2 to an enterprise gateway 570. The enterprise gateway 570 can then, via communication A3, forward the public key to a print server 580 located in a home enterprise 590. The print server 580 can acquire and process the print data which can include encrypting the print item with either the public key and/or a session key derived from, based on and/or produced by using the public key. A session key may be generated because encrypting the print item with the public key may not provide a desired level of service (e.g., encryption level, encryption speed). The session key may itself be encrypted using, for example, the public key.

In communication A4, the print server 580 may send the session key along with the processed print item to the print queue 550. In communication A5, the session key may be transmitted to the printer 520. The printer 520 can then parse out the session key, determine that it needs the phone 510 to decrypt the session key, and thus, via communication A6, pass the encrypted session key to the phone 510. The phone 510 can decrypt the session key and, via communication A7 pass the decrypted session key back to the printer 520. The printer 520 can then use the decrypted session key to decrypt the encrypted print item received form the print queue 550.

Thus, in one example, a secure foreign enterprise print system can include a wireless network web services provider 560. The provider 560 may include a wireless network communication logic (not illustrated) configured to communicate via cellular telephony with the cellular telephone 510 which is, more generally, a wireless communication device. The provider 560 may also include a controller logic 540 configured to receive a request to provide print services for a print item stored on the first enterprise 590 and, in response to receiving the request to provide print services, generating a request for the print item, identifying the gateway 570 to the first enterprise 590, and transmitting the request for the print item to the gateway 570.

The provider 560 may also include a print queue data store 550 configured to store encrypted print items, where the print queue data store 550 is organized, at least in part, on a per wireless communication device 510 user basis.

Thus, a wireless communication device user may have their own print queue in the print queue data store 550 in the provider 560. This may facilitate providing end to end security for the print item. The provider 560 may also include a print queue logic (not illustrated) configured to receive an encrypted print item from the first enterprise, to store the encrypted print item in the print queue data store 550, to receive a request for the encrypted print item from an image forming device (e.g., the printer 520) in a second enterprise, and to transmit the encrypted print item to the image forming device.

To facilitate relating a cellular telephone user print request with a gateway, in one example, the provider 560 may also include an enterprise gateway relationship data store 545 configured to store data that relates wireless communication device users with enterprise gateways. Thus, in one example, the controller logic 540 is configured to identify the gateway 570 to the first enterprise 590 based, at least in part, on data stored in the enterprise gateway relationship data store 545. In one example, the data store 545 is a table.

Figure 6:
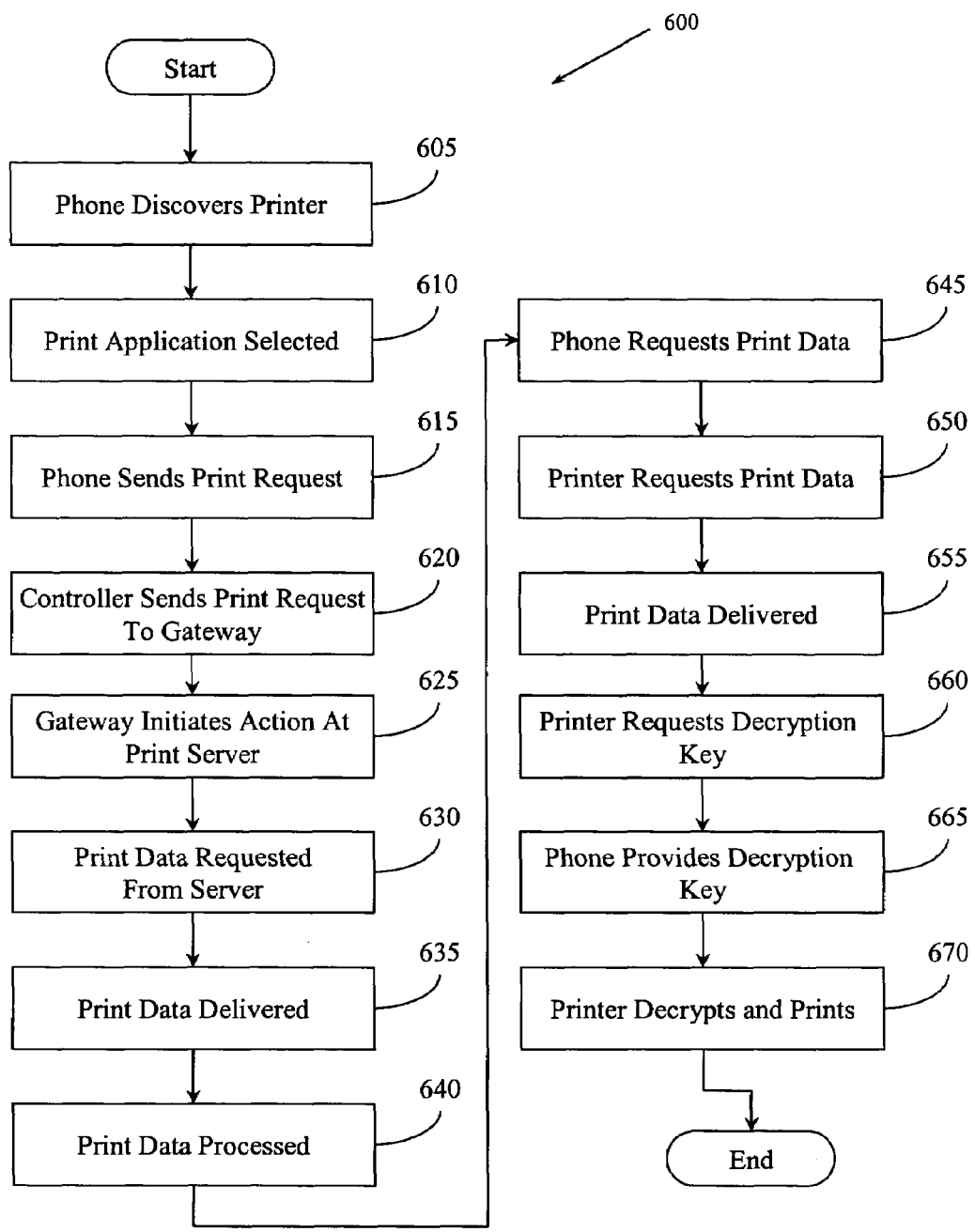
FIG. 6 illustrates an example method associated with a mobile wireless communication device securely printing data in a foreign enterprise.
Figure 7:
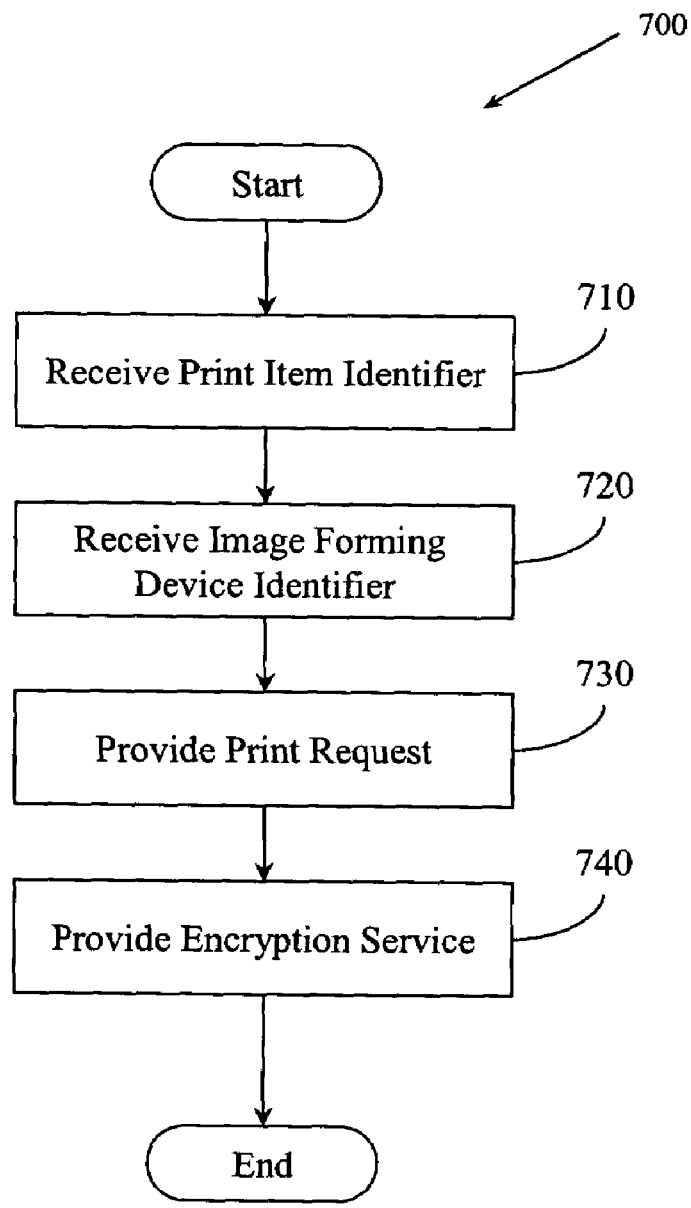
FIG. 7 illustrates an example method associated with a mobile wireless communication device securely printing data in a foreign enterprise.
Figure 8:
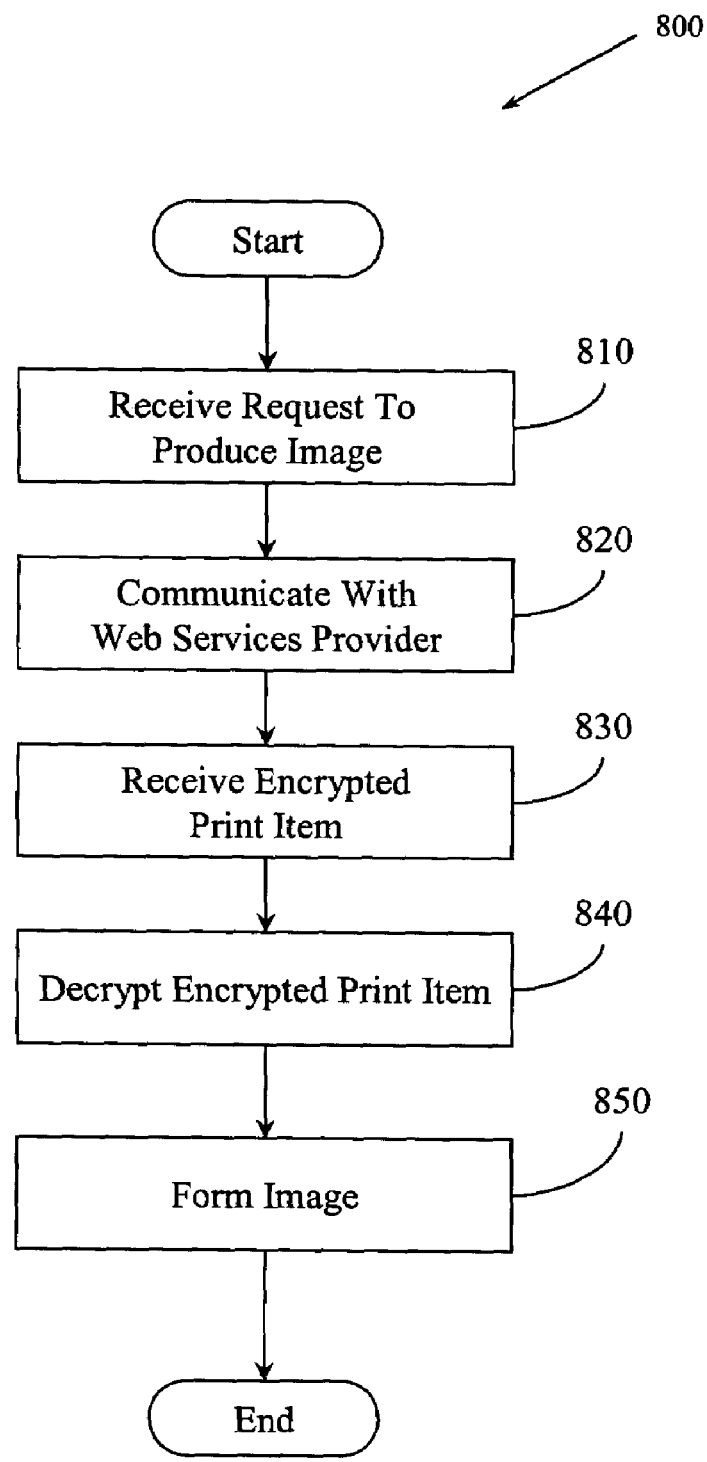
FIG. 8 illustrates an example method associated with a mobile wireless communication device securely printing data in a foreign enterprise.

Example methods may be better appreciated with reference to the flow diagrams of FIGS. 6 through 8. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In one example, methodologies are implemented as processor executable instructions and/or operations stored on a computer-readable medium.

In the flow diagrams, blocks denote "processing blocks" that may be implemented with logic.

A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 6 illustrates an example method 600 that includes some of the actions described above. For example, secure foreign enterprise systems may perform actions that include, at 605, a cellular telephone discovering a printer. At 610, the cellular telephone, now aware that it has an available printer, may select a print application. Thus, at 615 a print request is transmitted from the cellular phone to a controller. At 620, the controller transmits the print request to a gateway to the enterprise where the item selected by the print application resides.

At 625, the gateway initiates an action at a print server in the first enterprise so that at 630 a print data is requested from a server like an email, image, file, or message server. Thus, at 635 the print data is delivered to the print server and at 640 the print data is processed (e.g., encrypted, rendered, content transformed, compressed). At 645, the cellular telephone may request the print data by, for example, asking the printer to fetch the data from the print queue. At 650 the printer may request the print data and therefore at 655 the print data may be delivered. The print data may be encrypted and may include an encrypted session key that can be used to decrypt the encrypted print data. Therefore, at 660, the printer may request a decryption key from the cellular telephone and at 665 the cellular telephone may provide the decryption key. With the decryption key in hand, the printer may then, at 670 decrypt the print item and form an image from (e.g., print) the item.

FIG. 7 illustrates an example method 700 employed in secure foreign enterprise printing. The method 700 may include, at 710, receiving a print item identifier that identifies a print item to process. The print item may be stored, for example, in a first enterprise (e.g., a home enterprise). The method 700 also includes, at 720, receiving an image forming device identifier that identifies an image forming device on which the print item is to be processed. The image forming device may be located, for example, in a second enterprise (e.g., foreign enterprise). The image forming device may be, for example, a printer, a display, a monitor, a computer screen, and the like. In one example, the image forming device is a laser printer. In another example, the image forming device is an ink jet printer. The image forming device identifier can include, but is not limited to including, an image forming device address, an image forming device capability data, and an image forming device model data.

The method 700 may also include, at 730, providing a print request to a wireless network web services provider that has access to the first enterprise and the second enterprise. The print request may include, but is not limited to including, a print item identifier, an encryption key, an image forming device model data, an image forming device address, an image forming device capability data, and a print queue identifier.

The method 700 may also include, at 740, providing an encryption service that facilitates encrypting the print item in the first enterprise and decrypting the print item in the image forming device. In one example, providing an encryption service may include producing a one time public/private key pair that includes a public key component and a private key component, providing the public key component of the one time public/private key pair to the wireless network web services provider, and providing the private key component of the one time public/private key pair to the image forming device. In another example, providing an encryption service may include providing a public key to the wireless network web services provider, decrypting a session key associated with print item encrypted in the first enterprise where the encryption is based, at least in part, on the public key, and providing the decrypted session key to the image forming device.

FIG. 8 illustrates an example method 800 employed in secure foreign enterprise printing. The method 800 may include, at 810 receiving into an image forming device, from a wireless communication device, a request to produce an image from an encrypted print item stored in a print queue provided by a web services provider. The wireless communication device may be, for example, a cellular telephone. The image forming device may be, for example, a printer. The method 800 may also include, at 820, communicating with the web services provider to have the encrypted print item transmitted to the image forming device.

The method 800 may also include, at 830, receiving the encrypted print item and at 840 decrypting the encrypted print item into a decrypted print item. In one example, decrypting the encrypted print item may include parsing an encrypted session key out of the encrypted print item, providing the encrypted session key to the wireless communication device for decryption, and receiving a decrypted session key from the wireless communication device. Once the decrypted session key has been received, the encrypted print item may be decrypted into the decrypted print item based, at least in part, on the decrypted session key.

The method 800 may also include, at 850, forming an image from the decrypted print item. Additionally, in one example, the method 800 may include, at 810, in response to receiving the request to produce the image from the encrypted print item, generating a one time public/private key pair that includes a public key component and a private key component and providing the public key component of the one time public/private key pair to the wireless communication device. In this example, the method 800 may also include, at 840, decrypting the encrypted print item based, at least in part, on the private key component of the one time public/private key pair.

In one example, a computer-readable medium may store processor executable instructions operable to perform a method that includes, receiving a print item identifier that identifies a print item to process, where the print item is stored in a first enterprise, receiving an image forming device identifier that identifies an image forming device on which the print item is to be processed, where the image forming device is located in a second enterprise, providing a print request to a wireless network web services provider that has access to the first enterprise and the second enterprise, and providing an encryption service that facilitates encrypting the print item in the first enterprise and decrypting the print item in the image forming device. While the above method is described being stored on a computer-readable medium, it is to be appreciated that other example methods described herein can also be stored on a computer-readable medium.

Figure 9:
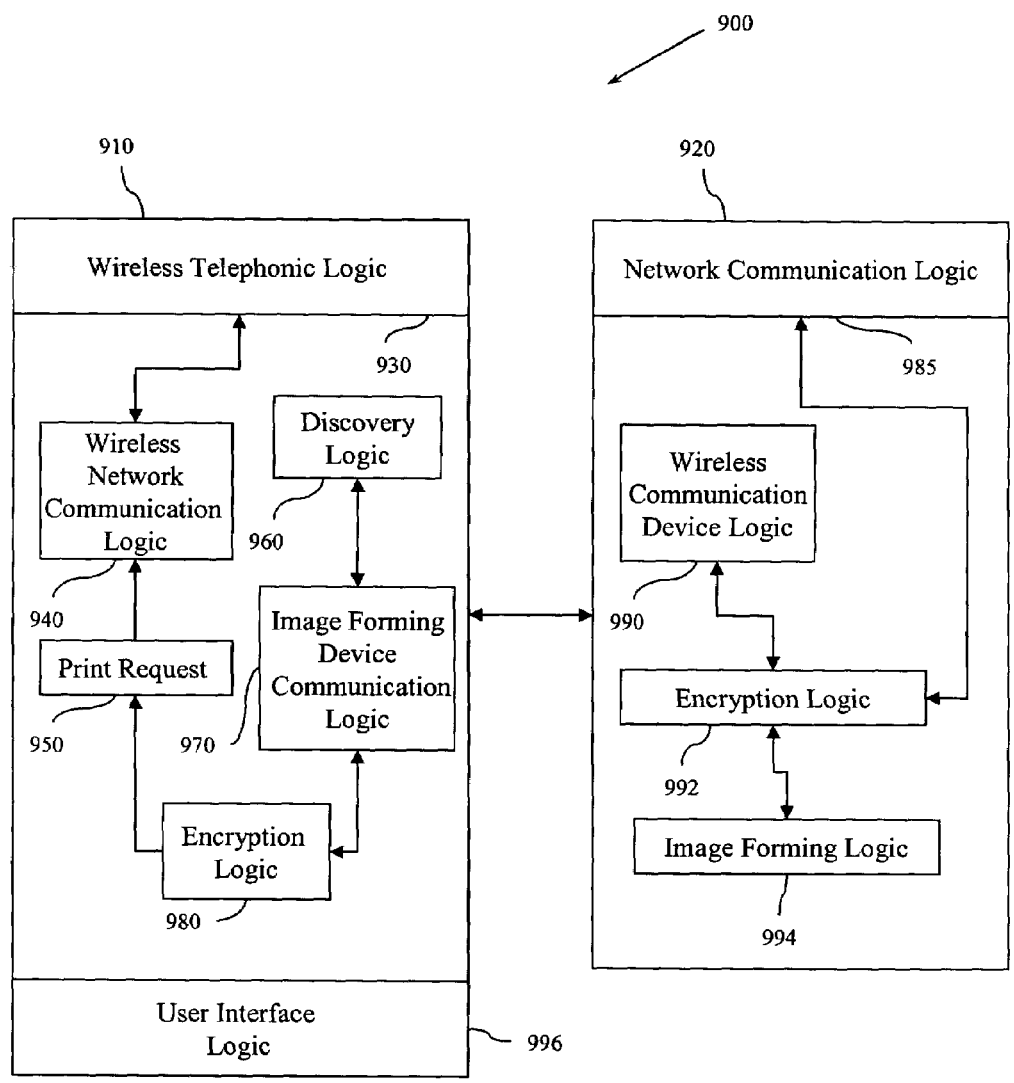
FIG. 9 illustrates an example cellular telephone interacting with an example printer.

FIG. 9 illustrates an example environment 900 where secure foreign enterprise printing may be desired. The environment 900 may include a wireless mobile communication system 910 and an image forming device 920. While the systems 910 and 920 are illustrated separately, it is to be appreciated that portions of the systems 910 and 920 may be integrated into a single system and/or distributed.

The wireless mobile communication system 910 may include a wireless telephonic logic 930 (e.g., a cellular telephone). The image forming device 920 may be, for example, a printer. The wireless mobile communication system 910 may include a wireless network communication logic 940 that is configured to communicate a print request 950 concerning a print item that is stored in a first enterprise. The print request 950 is related to having the print item formed into an image on the image forming device 920, where the image forming device 920 is located in a second enterprise. The print request 950 may be communicated, for example, to a wireless network web services provider via the wireless telephonic logic 930. In one example, the print request 950 can include, but is not limited to, a print item identifier, a user identifier, an encryption key, an image forming device model data, an image forming device capability data, an image forming device address, and a print queue identifier. The print item identifier may be, for example, a file name, a file address, a URL, a GUID, and the like. The user identifier may be, for example, a user name, a user account number, a user cellular telephone number, and so on. The image forming device model data and the image forming device capability data may include information about the name, type, processing power, memory size, transmission size, paper sizes, color capacity, and so on associated with the image forming device 920. The print queue identifier may be, for example, a network address, a URL, and the like. In one example, the encryption key is a public key component of a public/private key pair that includes a public key component and a private key component.

The system 910 may also include a discovery logic 960 configured to identify the image forming device 920 that the secure foreign enterprise print system can employ to form the image of the print item. The discovery logic 960 can facilitate retrieving, for example, image forming device data that may include, but is not limited to, a printer request, an encrypted encryption key, a decrypted encryption key, a print item identifier, an image forming device model data, an image forming device capability data, an image forming device address, and a print queue identifier.

The system 910 may also include an image forming device communication logic 970 configured to communicate an image forming device data with the image forming device 920. The print request 950 may be (re)configured based, at least in part, on the image forming device data. In one example, the image forming device communication logic 970 communicates with the image forming device 920 using an IEEE 802.11 communication, an IEEE 802.15 communication, an infrared communication, a Bluetooth communication, or the like.

The system 910 may also include an encryption logic 980 configured to facilitate providing end to end security for the print item as it travels from the first enterprise to the image forming device 920. In one example, providing end-to-end security is facilitated by communicating one or more encryption data with the image forming device 920 and/or the wireless network web services provider. In one example, the encryption logic 980 is configured to generate a one time public/private key pair that includes a public key component and a private key component, to provide the public key component of the one time public/private key pair to the wireless network web services provider via the wireless network communication logic 940, and to provide the private key component of the one time public/private key pair to the image forming device 920 via the image forming device communication logic 970. In another example, the encryption logic 980 is configured to provide a public key to the wireless network web services provider via the wireless network communication logic 940, to decrypt an encrypted session key associated with an encrypted print item into a decrypted session key, and to provide the decrypted session key to the image forming device 920.

The system 910 may, in one example, be configured with a user interface logic (not illustrated) that is configured to facilitate selecting the print item from the first enterprise. The user interface logic may be configured, for example, as a browser, a file selector, a folder viewer, and the like.

FIG. 9 also illustrates the image forming system 920. The image forming system 920 may include a network communication logic 985 configured to communicate with the web services provider. The network communication logic 985 may communicate with the web services provider via, for example, HTTP messages delivered via the Internet. Recall that the wireless communication device 910 (e.g., cellular telephone) is configured to use the web services provider for print services associated with producing the image from the print item on the image forming device 920. Also recall that the image forming device 920 is in a second enterprise while the print item is stored in a first enterprise. Thus, in one example, the network communication logic 985 is configured to request an encrypted print item from a print queue associated with the web services provider. In another example, the network communication logic 985 is configured to receive the encrypted print item from the print queue associated with the web services provider.

The system 920 may also include a wireless communication device logic 990 configured to communicate with the wireless communication device 910. In one example, the wireless communication device logic 990 is configured to communicate the image forming device data with the wireless communication device 910. The wireless communication device logic 990 may communicate with the wireless communication device 910 using, for example, an IEEE 802.11 communication, an IEEE 802.15 communication, an infrared communication, and a Bluetooth communication.

The system 920 may also include an encryption logic 992 configured to facilitate providing end to end security for the print item. In one example, the encryption logic 992 is configured to generate a one time public/private key pair that includes a public key component and a private key component, to provide the public key component of the one time public/private key pair to the wireless communication device 910, and to decrypt the encrypted print item received from the web services provider based, at least in part, on the private key component of the one time public/private key pair. In another example, the encryption logic 992 is configured to parse the encrypted session key out of the encrypted print item received from the web services provider, to provide the encrypted session key to the wireless communication device 910, to receive a decrypted session key from the wireless communication device 910, and to decrypt the encrypted print item based, at least in part, on the decrypted session key.

The system 920 may also include an image forming logic 994 configured to produce the image from the print item. Various image forming logics 994 are described below in connection with FIG. 10 and image forming mechanism 1030.

Figure 10:
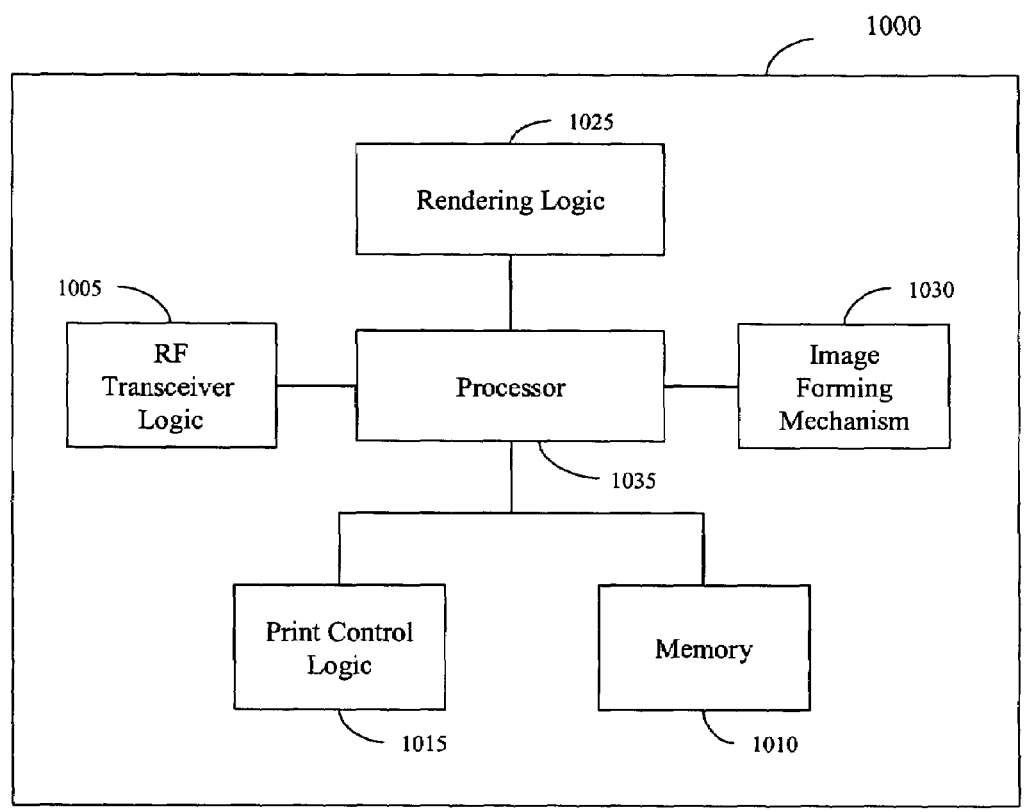
FIG. 10 illustrates an example image forming device that may interact with a system or method for secure foreign enterprise printing.

FIG. 10 illustrates an example image forming device 1000 that includes a compatible RF transceiver logic 1005. The image forming device 1000 may include a memory 1010 configured to store data associated with secure foreign enterprise printing. The data can include, but is not limited to, encrypted print data, decrypted print data, a public key, a private key, a session key, print request data, a web service provider address, and the like.

The image forming device 1000 may be configured to respond to requests from cellular telephones relating to printing and/or to generate queries to a cellular telephone with respect to a print job. Therefore, image forming device 1000 may include a print control logic 1015 that can perform actions like servicing requests and transmitting information about the data stored in memory 1010 and/or the processing thereof. Print control logic 1015 may also, periodically, or under image forming device 1000 control, transmit information about the data stored in memory 1010 and/or the processing thereof. Print control logic 1015 may also be configured to initiate the transmission of data and/or information to a cellular telephone without receiving a query, status request, print service request, or the like.

Image forming device 1000 may receive printer ready data that does not require rendering and/or data that may need to be rendered. Thus, image forming device 1000 may include rendering logic 1025 configured to generate a printer-ready image from a print data. Rendering varies based on the format of the data involved and the type of imaging device. In general, rendering logic 1025 converts high-level data into a graphical image for a display or printing (e.g., the print-ready image). For example, one form is ray-tracing that takes a mathematical model of a three-dimensional object or scene and converts it into a bitmap image. Another example is the process of converting HTML into an image for display/printing.

Image forming device 1000 may also include an image forming mechanism 1030 configured to generate an image onto print media from the print-ready image. Image forming mechanism 1030 may vary based on the type of imaging device 1000 and may include a laser imaging mechanism, other toner-based imaging mechanisms, an ink jet mechanism, digital imaging mechanism, or other imaging reproduction engine. A processor 1035 may be included that is implemented with logic to control the operation of the image-forming device 1000. In one example, processor 1035 includes logic that is capable of executing Java instructions. Other components of image forming device 1000 are not described herein but may include media handling and storage mechanisms, sensors, controllers, and other components involved in the imaging process.

Figure 11:
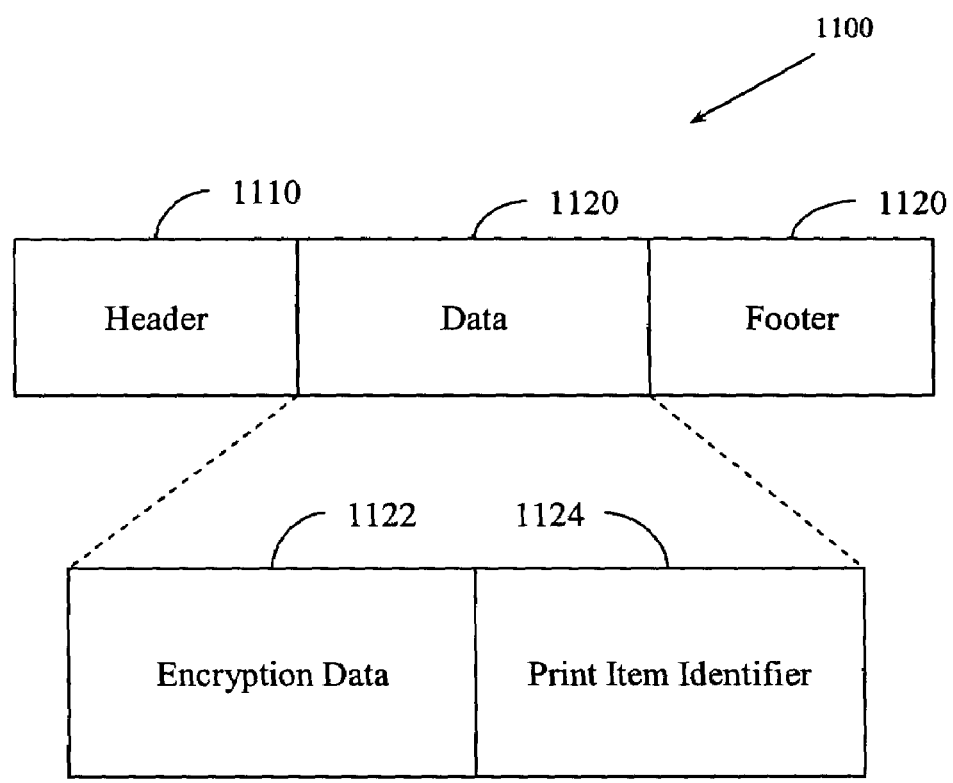
FIG. 11 illustrates an example data packet associated with systems and methods for secure foreign enterprise printing.

FIG. 11 illustrates an example data packet 1100 associated with systems and methods for secure foreign enterprise printing. Information can be transmitted between various logics and/or communication components associated with secure foreign enterprise printing via a packet like data packet 1100. Example data packet 1100 includes a header field 1110 where information like the length and type of data packet 1100 may be stored. Header field 1110 may also include, for example, a source identifier that identifies, for example, a network or other address of the source of data packet 1100. Header field 1110 may also include, for example, a destination identifier that identifies, for example, a network or other address of the intended destination for packet 1100. Thus, header field 1110 may include, in one example, a cellular telephone address associated with a cellular telephone from which a print request originated and a network address of a printer to which the print job is to be delivered. It is to be appreciated that the source and destination identifiers may take forms including, but not limited to, GUID, URLs, path names, and so on.

A data field 1120, which may include various sub-fields may include various information intended to be communicated between the source and destination. Example fields 1122 and 1124 are provided. Field 1122 may store, for example, encryption data that facilitates providing end-to-end security for a print item. By way of illustration, a public key that will be employed to encrypt data in a home enterprise to facilitate end-to-end security may be stored in field 1122. The public key may have been provided, for example, by a cellular telephone or by a printer on which the print item will be printed. By way of further illustration, a print item identifier that will be employed to identify the item in a home enterprise that is to be printed in the foreign enterprise may be stored in field 1124. The identifier may be, for example, a URL, a GUID, a file name, an address, and the like.

Figure 12:
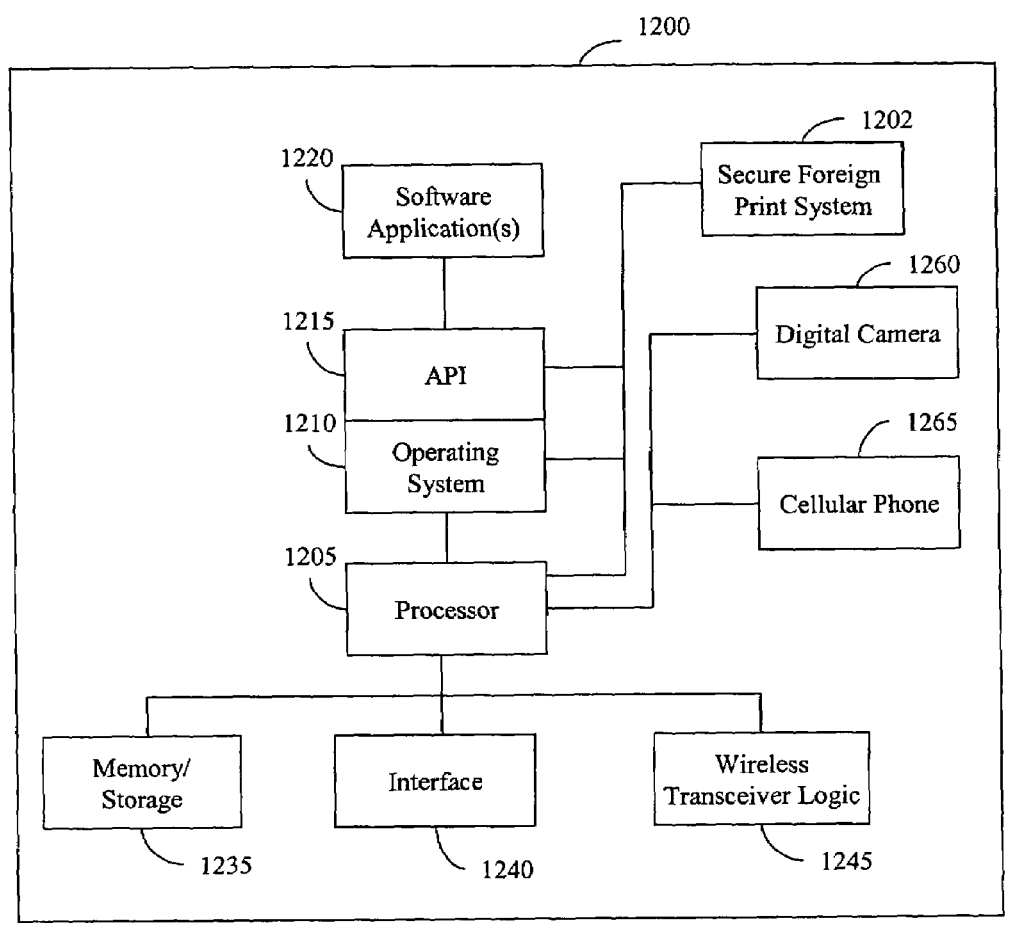
FIG. 12 illustrates an example cellular telephone configured with an example system for secure foreign enterprise printing.

FIG. 12 illustrates an example cellular telephone 1200 that includes a secure foreign enterprise print system 1202. Cellular telephone 1200 may communicate with an image forming device (not illustrated) over a wireless network using, for example, Bluetooth protocols, and/or IEEE 802.11 protocols. Bluetooth refers to short-range radio technology concerned with data and/or computer communications.

Information concerning the Bluetooth specification and protocols can be found, for example, at www.bluetooth.org. IEEE 802.11 refers to a family of specifications developed by the IEEE for wireless local area network (LAN) technology.

In addition to the secure foreign enterprise print system 1202, the cellular telephone 1200 may include a processing system that has, for example, a processor 1205, an operating system 1210, and an application programming interface (API) 1215 to facilitate communications between one or more of, the software application 1220, the secure foreign enterprise print system 1202, and the operating system 1210. The processing system of the cellular telephone 1200 can be configured to execute a variety of software applications 1220.

Other components of the cellular telephone 1200 may include a memory and/or storage 1235 that can include a computer-readable medium. The storage 1235 may also include a port that accepts and reads data stored on a removable memory card or other removable computer-readable medium. An interface 1240 can include a display screen, one or more buttons, a pointing device, or other types of devices that can communicate data to a user and receive input from a user. To perform wireless communication, a wireless transceiver logic 1245 is provided. Depending on the wireless protocol desired, the transceiver logic 1245 can be configured according to different specifications.

In one example, the wireless protocol is Bluetooth based and the transceiver 1245 would include a Bluetooth radio and antenna. Other protocols include IEEE 802.11 and other available wireless protocols. In one example, the wireless transceiver logic 1245 includes a radio frequency transceiver configured to transmit and receive radio frequency signals. Infrared communication can also be employed. The transceiver logic 1245 may be, for example, a microchip in the cellular telephone 1200 or configured on a removable device like a PCMCIA card (PC card) that can be connected and disconnected to the cellular telephone 1200 via a connection port or slot. In one example, the cellular telephone 1200 includes a digital camera 1260. In this example, the cellular telephone 1200 may be referred to as a camera-enabled phone.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on employed in secure foreign enterprise printing. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A secure foreign enterprise print system, comprising:
   a wireless telephonic device;
   a wireless network communication logic configured to communicate a print request to a wireless network web services provider via the wireless telephonic device, the print request being related to a print item stored in a first enterprise and an image forming device located in a second enterprise;
   a discovery logic configured to identify the image forming device;
   an image forming device communication logic configured to communicate an image forming device data with the image forming device; and
   an encryption logic configured to generate a one time public/private key pair that includes a public key component and a private key component, to provide the public key component of the one time public/private key pair to the wireless network web services provider via the wireless network communication logic, and to provide the private key component of the one time public/private key pair to the image forming device via the image forming device communication logic.

2. The system of claim 1, where the wireless telephonic device comprises a cellular telephone.

3. The system of claim 1, where the image forming device comprises a printer.

4. The system of claim 3, where the print request includes one or more of, a print item identifier, a user identifier, an image forming device model data, an image forming device capability data; an image forming device address, and a print queue identifier.

5. The system of claim 1, where the image forming device communication logic is configured to communicate with the image forming device using one or more of, an IEEE 802.11 communication, an IEEE 802.15 communication, an infrared communication, and a Bluetooth communication.

6. The system of claim 1, where the image forming device data includes one or more of, a printer request, an encrypted encryption key, a decrypted encryption key, a print item identifier, an image forming device model date, an image forming device capability data, an image forming device address, and a print queue identifier.

7. The system of claim 1, comprising: a user interface logic configured to facilitate selecting the print item from the first enterprise.

8. A method, comprising:
   receiving a print item identifier that identifies a print item to process, where the print item is stored in a first enterprise;
   receiving an image forming device identifier that identifies an image forming device on which the print item is to be processed, where the image forming device is located in a second enterprise;
   providing a print request to a wireless network web services provider that has access to the first enterprise and the second enterprise; and providing an encryption service that facilitates encrypting the print item in the first enterprise and decrypting the print item in the image forming device where providing an encryption service includes producing a one time public/private key pair that includes a public key component and a private key component, providing the public key component of the one time public/private key pair to the wireless network web services provider, and providing the private key component of the one time public/private key pair to the image forming device.

9. The method of claim 8, where the image forming device identifier includes one or more of, an image forming device address, an image forming device capability data, and an image forming device model data.

10. The method of claim 8, where the print request includes one or more of, a print item identifier, an image forming device model data, an image forming device address, an image forming device capability data, and a print queue identifier.

11. The method of claim 8, where the image forming device comprises a printer.

12. A volatile or non-volatile computer readable medium storing processor executable instructions operable to perform a method, the method comprising:
receiving a print item identifier that identifies a print item to process, where the print item is stored in a first enterprise;
receiving an image forming device identifier that identifies an image forming device on which the print item is to be processed, where the image forming device is located in a second enterprise;
providing a print request to a wireless network web services provider that has access to the first enterprise and the second enterprise; and
providing an encryption service that facilitates encrypting the print item in the first enterprise and decrypting the print item in the image forming device where providing an encryption service includes producing a one time public/private key pair that includes a public key component and a private key component, providing the public key component of the one time public/private key pair to the wireless network web services provider, and providing the private key component of the one time public/private key pair to the image forming device.

13. An image forming system, comprising:
a network communication logic configured to communicate with a web services provider;
a wireless communication device logic configured to communicate with a wireless communication device and to employ the web services provider for print services associated with producing an image from a print item stored in a first enterprise, where the image forming system is located in a second enterprise;
an encryption logic configured to facilitate providing security for the print item as it is communicated from the first enterprise to the image forming system via the web services provider; and
an image forming device configured to produce the image from the print item;
where the encryption logic is configured to parse an encrypted session key out of an encrypted print item received from the web services provider, to provide the encrypted session key to the wireless communication device, to receive a decrypted session key from the wireless decrypted session key.

14. The system of claim 13, where the network communication logic is configured to communicate via the public Internet.

15. The system of claim 13, where the network communication logic is configured to request an encrypted print item from a print queue associated with the web services provider.

16. The system of claim 13, where the network communication logic is configured to receive an encrypted print item from a print queue associated with the web services provider.

17. The system of claim 13, where the wireless communication device logic is configured to communicate an image forming device data with the wireless communication device.

18. The system of claim 17, where the image forming device data includes one or more of, a printer request, a print item identifier, an image forming device model data, an image forming device capability data, an image forming device address, and a print queue identifier.

19. The system of claim 13, where the wireless communication device logic communicates with the wireless communication device using one or more of an IEEE 802.11 communication, an IEEE 802.15 communication, an infrared communication, and a Bluetooth communication.

20. The system of claim 13, where the image fanning device is a printer.

21. The system of claim 13, where the wireless communication device is a cellular telephone.

22. A method, comprising:
receiving into an image forming device, from a wireless communication device, a request to produce an image from an encrypted print item stored in a print queue provided by a web services provider;
communicating wit the web services provider to have the encrypted print item transmitted to the image forming device; receiving the encrypted print item;
decrypting the encrypted print item into a decrypted print item where decrypting the encrypted print item comprises:
retrieving an encrypted session key from the encrypted print item: providing the encrypted session key to the wireless communication device for decryption;
receiving a decrypted session key from the wireless communication device; and decrypting the encrypted print item into the decrypted print item based, at least in part, on the decrypted session key, and
forming an image from the decrypted print item.

23. A volatile or non-volatile computer readable medium storing processor executable instructions operable to perform a method, the method comprising:
receiving into an image forming device, from a wireless communication device, a request to produce an image from an encrypted print item stored in a print queue provided by a web services provider;
communicating with the web services provider to have the encrypted print item transmitted to the image forming device;
receiving the encrypted print item;
decrypting the encrypted print item into a decrypted print item where decrypting the encrypted print item comprises:
retrieving an encrypted session key from the encrypted print item; providing the encrypted session key to the wireless communication device for decryption;
receiving a decrypted session key from the wireless communication device; and decrypting the encrypted print item into the decrypted print item based, at least in part, on the decrypted session key; and forming an image from the decrypted print item.

24. A secure foreign enterprise print system, comprising:

a cellular telephone comprising:
- a wireless network communication logic configured to communicate a print request related to a print item that is stored in a first enterprise and a printer that is located in a second enterprise, where the print request is communicated to a wireless network web services provider via cellular telephony;
- a discovery logic configured to identify the printer that the secure foreign enterprise print system will employ to print the print item;
- a printer communication logic configured to communicate a printer data with the printer, where the print request may be configured based, at least in part, on the printer data; and
- a cellular telephone encryption logic configured to facilitate providing security for the print item as it travels from the first enterprise to the printer, where providing security is facilitated by communicating an encryption data with one or more of, the printer, and the wireless network web services provider; and a printer, comprising:
- a network communication logic configured to communicate with the wireless network web services provider;
- a wireless communication device logic configured to communicate with the cellular telephone;
- a printer encryption logic configured to facilitate providing security for the print item by communicating the encryption data with the cellular telephone; and
- an image forming logic configured to produce a printable image from the print item;

where the cellular telephone encryption logic is configured to generate a one time public/private key pair that includes a public key component and a private key component, to provide the public key component of the one time public/private key pair to the wireless network web services provider via the wireless network communication logic, and to provide the private key component of the one time public/private key pair to the image forming device via the image forming device communication logic.

25. The system of claim 24, where the network communication logic is configured to request an encrypted print item from a print queue associated with the web services provider.

26. The system of claim 24, where the network communication logic is configured to receive an encrypted print item from a print queue associated with the web services provider.

27. A secure foreign enterprise print system, comprising:
- a wireless network communication device configured to communicate via cellular telephony with one or more wireless communication devices;
- a controller logic configured to receive a request to provide print services for a print item stored on a first enterprise and, in response to receiving the request to provide print services, generating a request for the print item, identifying a gateway to the first enterprise, and transmitting the request for the print item to the gateway;
- a print queue data store configured to store one or more encrypted print items, where the print queue data store is organized, at least in part, on a per wireless communication device user basis;
- a print queue logic configured to receive an encrypted print item from the first enterprise, to store the encrypted print item in the print queue data store, to receive a request for the encrypted print item from an image forming device in a second enterprise, and to transmit the encrypted print item to the image forming; and
- an encryption logic configured to parse an encrypted session key out of an encrypted print item from the print queue data store, to provide the encrypted session key to a wireless communication device, to receive a decrypted session key from the wireless communication device, and to decrypt the encrypted print item based, at least in part on the decrypted session key.

28. The system of claim 27, where the one or more wireless communication devices comprise cellular telephones.

29. The system of claim 27 further comprising:
- an enterprise gateway relationship data store configured to store data that relates a wireless communication device user with an enterprise gateway; and
- where the controller logic is configured to identify the gateway to the first enterprise based, at least in part, on data stored in the enterprise gateway relationship data store.

30. The system of claim 29, where the enterprise gateway relationship data store comprises a table.

31. A secure foreign enterprise print system, comprising:

a cellular telephone comprising:
- a first wireless network communication logic configured to communicate a print request related to a print item that is stored in a first enterprise and a printer that is located in a second enterprise, where the print request is communicated to a wireless network web services provider via cellular telephony;
- a discovery logic configured to identify the printer that the secure foreign enterprise printing system will employ to print the print item;
- a printer communication logic configured to communicate a printer data with the printer, where the print request may be configured based, at least in part, on the printer data; and
- a cellular telephone encryption logic configured to facilitate providing security for the print item as it travels from the first enterprise to the printer where providing security is facilitated by communicating one or more encryption data with one or more of, the printer and the wireless network web services provider, the cellular telephone encryption logic being configured to generate a one time public/private key pair that includes a public key component and a private key component, to provide the public key component of the one time public/private key pair to the wireless network web services provider via the first wireless network communication logic, and to provide the private key component of the one time public/private key pair to a printer via a network communication logic;

a printer, comprising:
- a network communication logic configured to communicate with the wireless network web services provider;

a wireless communication device logic configured to communicate with the cellular telephone;

a printer encryption logic configured to facilitate providing security for the print item by communicating one or more encryption data with the cellular telephone; and an image forming logic configured to produce a printable image from the print item; and a web services provider comprising: a second wireless network communication logic configured to communicate via cellular telephony with the cellular telephone;

a controller logic configured to receive a request to provide print services and, in response to receiving the request to provide print services, generating a request for the print item, identifying a gateway to the first enterprise, and transmitting the request for the print item to the gateway;

a print queue data store configured to store one or more encrypted print items, where the print queue data store is organized, at least in part, on a per cellular telephone user basis; and a print queue logic configured to receive an encrypted print item from the first enterprise, to store the encrypted print item in the print queue data store, to receive a request for the encrypted print item from the printer, and to transmit the encrypted print item to the printer.

* * * * *

UNITED STATES PATENT AND TRADEMARK OFFICE
CERTIFICATE OF CORRECTION

PATENT NO. : 7,349,543 B2 Page 1 of 1
APPLICATION NO. : 10/686979
DATED : March 25, 2008
INVENTOR(S) : Shell S. Simpson et al.

It is certified that error appears in the above-identified patent and that said Letters Patent is hereby corrected as shown below:

In column 16, line 41, in Claim 4, after "data" delete ";" and insert -- , --, therefor.

In column 16, line 51, in Claim 6, delete "date" and insert -- data --, therefor.

In column 17, line 67, in Claim 13, after "wireless" insert -- communication device, and to decrypt the encrypted print item based, at least in part, on the --.

In column 18, line 26, in Claim 20, delete "fanning" and insert -- forming --, therefor.

In column 18, line 35, in Claim 22, delete "wit" and insert -- with --, therefor.

In column 18, line 42, in Claim 22, after "item" delete ":" and insert -- ; --, therefor.

In column 18, line 47, in Claim 22, after "key" delete "," and insert -- ; --, therefor.

In column 20, line 10, in Claim 27, after "forming" insert -- device --.

In column 20, line 18, in Claim 27, after "part" insert -- , --.

In column 20, line 22, in Claim 29, delete "claim 27" and insert -- claim 27, --, therefor.

Signed and Sealed this

Fifth Day of May, 2009

JOHN DOLL
*Acting Director of the United States Patent and Trademark Office*